(12) United States Patent
Yamamoto et al.

(10) Patent No.: US 6,292,275 B1
(45) Date of Patent: Sep. 18, 2001

(54) IMAGE SCANNING APPARATUS AND METHOD, AND MIRROR DRIVE METHOD AND MECHANISM

(75) Inventors: Hajime Yamamoto, Kanagawa; Masato Iwakawa, Tokyo, both of (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/156,660

(22) Filed: Sep. 18, 1998

(30) Foreign Application Priority Data

Sep. 18, 1997 (JP) .................................................. 9-253348

(51) Int. Cl.[7] .................................................. H04N 1/04
(52) U.S. Cl. ........................ 358/474; 358/497; 382/312
(58) Field of Search .................................. 358/497, 474, 358/496, 498, 426; 382/312, 321

(56) References Cited

U.S. PATENT DOCUMENTS 4,410,233 * 10/1983 Gerhardt ................................. 350/6.6
5,576,536 * 11/1996 Hiramatsu .............................. 250/236
6,055,070 * 4/2000 Kang ...................................... 358/497

FOREIGN PATENT DOCUMENTS 6-294160  10/1994  (JP) .
6-133079   5/1999  (JP) .

\* cited by examiner

Primary Examiner—Jerome Grant, II
Assistant Examiner—Negussie Worku
(74) Attorney, Agent, or Firm—Foley & Lardner

(57) ABSTRACT

The present invention enables to scan in a sub scan direction an image on a scan medium placed on a flat plane using a simple configuration of a one-dimensional image sensor at a fixed position in combination with a reflecting mirror. A drive source having a constant rpm is used to rotate the reflecting mirror at an angular velocity changing in a non-linear way. The rotation of the drive source is transmitted to a drive mechanism linked to a four-node link mechanism to rotate the reflecting mirror at an angular velocity changing in a non-linear way, so that the scan position on the scan medium is shifted in the sub scan direction at a constant linear velocity.

6 Claims, 7 Drawing Sheets

IMAGE SCANNING APPARATUS AND METHOD, AND MIRROR DRIVE METHOD AND MECHANISM

BACKGROUND OF THE INVENTION

1. Field of the Invention

The present invention relates to an image scanning apparatus and method for scanning an image on a reading medium such as a sheet of paper, and a mirror drive method and mechanism for rotating a reflecting mirror.

2. Description of the Related Art

Conventionally, a flat bed type image scanner has been widely used for reading/scanning an image on a surface of a reading medium such as a manuscript. This flat bed type image scanner normally has a contact glass arranged in a horizontal direction as medium placement means. Below this contact glass, there is provided an image scanning mechanism.

This image scanning mechanism includes, for example, an image sensor having a number of photo elements arranged in a main scanning direction and a support body for supporting the image sensor at a position parallel to the contact glass in such a manner that the image sensor can be moved in a sub scanning direction. In this flat bed type image scanner, the image on a reading medium placed on the contact glass can be scanned as a number of main scanning lines continuous in the sub scanning direction.

It should be noted that as such a flat bed type image scanner, there is a model in which the image sensor is fixed and a pair of scanning mirrors is moved in the sub scanning direction for scanning an image on a reading medium. Moreover, there is an image scanning apparatus in which the image sensor is fixed and the contact glass is moved in the sub scanning direction. Furthermore, there is an image scanning apparatus in which the image sensor is fixed and a manuscript as the reading medium is moved in the sub scanning direction by a sheet feed mechanism.

In the aforementioned image scanning apparatuses using the contact glass, the reading medium is placed with its image downward on the contact glass and a user cannot observe the image which is being scanned.

Moreover, in the model having a fixed image sensor, a reading medium is placed with its image upward on a sheet feeding mechanism and a user can observe the image which is being scanned. However, a jam may be caused in the sheet feeding mechanism when comparatively thin sheets of paper are set on the sheet feeding mechanism.

These problems are solved by image scanning apparatuses disclosed in Japanese Patent Applications No. 6-13307 and No. 6-294160. These image scanning apparatuses includes a table as medium arrangement means on which a reading medium is placed, and above this table, there is provided a scanner head supported by a support arm.

The scanner head has an image sensor, an image formation optical system, and a reflecting mirror which are built in the scanner head. The reflecting mirror is rotatably supported on a rotary shaft which is arranged in parallel to the main scanning direction. The reflecting mirror reflects an image light, i.e., a reflected light or transmitting light from the reading medium, into a predetermined direction which vertically intersects the main scanning direction.

This image sensor has one-dimensional structure consisting of a number of photo elements arranged in the main scan direction so as to read a main scan line consisting of a number of dots. Furthermore, reflecting mirror is rotated so that the main scan line reading position is shifted in the sub scan direction. Thus, a two-dimensional image is read/scanned by the number of main scan lines continuous in the sub scan direction.

In the image scanning apparatus having the aforementioned configuration, a reading medium is placed with its image facing upward on the table. That is, a user can observe the image while it is being scanned. Moreover, there is no need of feeding a reading medium by a feeding mechanism. Accordingly, there is no problem in reading an image on a very thin sheet of paper or on a page of a thick book.

In the aforementioned image scanning apparatus, there is a problem that during the sub scanning on the scan medium carried out by the rotation of the reflecting mirror, the sub scan speed of the scan position on the scan medium is fluctuated if the reflecting mirror is rotated at a constant angular velocity.

That is, at a center position where an image is scanned at a right angle, the sub scan linear velocity becomes smallest, and the linear velocity is increased as the scan position is shifted from the center to the end portion of the manuscript. If the image sensor reads main scan lines at a constant interval in this state, the image data obtained is such that a center potion is expanded and the both end portions are contracted.

For example, it is possible to electronically control the image sensor scan interval corresponding to the rotation angle of the reflecting mirror or to correct by way of data processing the image data scanned. However, these require a complicated processing operation. In the former case, the light reception amount of the image sensor is varied and in the latter case, the resolution of the image data is finally lowered.

In order to solve the aforementioned problems, conventionally, the angular velocity of the reflecting mirror is changed in a non-linear way so that the scan position on the scan medium is moved in the sub scan direction is a constant linear velocity. Thus, for controlling the angular velocity of the reflecting mirror, a voice coil motor has been used as a drive source for servo control of the reflecting mirror rotation. However, this complicates the circuit configuration, reducing the productivity and disabling to reduce the apparatus size.

SUMMARY OF THE INVENTION

It is therefore an object of the present invention to provide an image scanning method and apparatus employing a reflecting mirror rotation for the sub scanning, an angular velocity of which is controlled with a simple configuration to be non-linear so that the sub scan speed is constant.

The image scanning method according to the present invention comprising steps of: reflecting with a reflecting mirror an image light generated from an image of a medium arranged in a plane continuous in a main scan direction and in a sub scan direction, into a predetermined direction vertically intersecting the main scan direction; introducing the reflected image light to an image formation optical system so as to obtain an image formation at position of an image sensor consisting of a number of photo elements arranged in a direction parallel to the main scan direction; and rotating with a drive force of a drive source the reflecting mirror pivotally supported by a rotary shaft parallel to the main scan direction so that a scan position of the image sensor on the medium is moved in the sub scan direction;

wherein the drive source provides rotation of a constant angular velocity which is converted by a four-node link mechanism into the rotation of the reflecting mirror having an angular velocity changed in a non-linear way, so that the scan position on the scan medium by the image sensor is moved in the sub scan direction at a constant linear velocity.

Thus, an image light generated from a scan image is reflected by the reflecting mirror to a predetermined direction vertically intersecting the main scan direction so that an image formation is obtained at a light reception position of the image sensor by the image formation optical system and the image light is read as a main scan line by a number of photo elements of the image sensor. Here, the reflecting mirror is rotated so that a scan position of the image sensor on the scan medium is shifted in the sub scan direction. Thus, a two-dimensional image is scanned as a number of main scan lines continuous in the sub scan direction. A constant angular velocity of the drive source is changed by a four-node link mechanism into a non-linearly changing angular velocity of rotation of the reflecting mirror, so that a scan position of the image sensor on the scan medium is shifted in the sub scan direction at a constant linear velocity.

It should be noted that the term "image light" represents a light flux corresponding to an image on the scan medium such as a reflected light from the scan medium or the light which has transmitted through the scan medium. Moreover, the main scan direction represents a direction of the photo elements arranged in the image sensor, and the sub scan direction vertically intersects the main scan direction projected on the surface of the scan medium.

The image scanning apparatus according to the present invention comprises: medium placing means for placing a scan medium having on its surface an image to be scanned, on a flat plane continuous in a main scan direction and in a sub scan direction; a reflecting mirror for reflecting an image light generated from the image of the medium arranged by the medium setting means, into a predetermined direction vertically intersecting the main scan direction; an image formation optical system for image formation at a predetermined position from the reflected image light; an image sensor provided at the image formation position of this image formation optical system and consisting of a number of photo elements arranged in a direction parallel to the main scan direction; a drive source for generating a predetermined drive force; a mirror support mechanism having a rotary shaft for supporting the reflecting mirror so as to be rotatable in a direction parallel to the main scan direction; and a mirror drive mechanism linked to the drive source for rotating the reflecting mirror at an angular velocity changing in a non-linear way so that a scan position of the image sensor on the medium is moved in the sub scan direction at a constant linear velocity.

Thus, a scan medium is arranged on a plane of the manuscript area continuous in the main scan direction and in the sub scan direction. An image light generated by an image on the scan medium is reflected by the reflecting mirror in a predetermined direction vertically intersecting the main scan direction. The image light reflected is focused by the image formation optical system at a predetermined position. The image light is for the image formation is read as a one-dimensional main scan line by a number of photo elements arranged in the main scan direction of the image sensor.

Here, the reflecting mirror supported by the mirror support mechanism on a rotary shaft parallel to the main scan direction is rotated by a the mirror drive mechanism driven by the drive source so that a scan position of the image sensor on the scan image is shifted in the sub scan direction. Thus, a two-dimensional image is read/scanned as a number of main scan lines continuous in the sub scan direction. It should be noted that rotation of the drive source having a constant angular velocity is converted by the mirror drive mechanism into the rotation of the reflecting mirror having an angular velocity that changes in a non-linear way, so that the scan position of the image sensor on the scan medium is shifted in the sub scan direction at a constant linear velocity.

According to another aspect of the present invention, the mirror drive mechanism comprises a four-node link mechanism. This four-node link mechanism converts the rotation of the drive source having a constant angular velocity into the rotation of the reflecting mirror having an angular velocity changing in a non-linear way.

According to still another aspect of the present invention, the link mechanism has: a drive link of a small crank shape linked to the drive source; a follower link of a long crank shape linked to the reflecting mirror; and an interlock link for linking between an end portion of the drive link and an end portion of the follower link, wherein the drive link is approximately at a right angle to the interlock link when an optical path of an image light coming into the reflecting mirror intersects the scan image approximately at a right angle.

Thus, when the drive link linked to the drive source is rotated with a constant angular velocity, the follower linked to the interlock link is also rotated. The interlock link moves with a velocity which is at its maximum when the interlock link is approximately at a vertical position to the drive link. In this state, the follower link also has a maximum angular velocity.

The mirror drive method accoridng to the present invention drives a rotatable reflecting mirror for reflecting an optical path penetrating a predetermined point and a predetermined plane in such a manner that an intersecting point of the optical path and the plane is shifted in a linear way, wherein a rotation of a constant angular velocity is converted into a rotation of an angular velocity changing in a non-linear way, so that the intersecting point is shifted at a constant linear velocity.

Thus, rotation of a constant angular velocity is converted by the four-node link mechanism into the rotation of the reflecting mirror having an angular velocity changing in a non-linear way, so that the intersecting point of the optical path on the plane is shifted at a constant linear velocity.

The mirror drive mechanism according to the present invention comprises: a drive link of a short crank shape which is driven to rotate at a constant angular velocity; a follower link of a long crank shape which is linked to a reflecting mirror supported on a rotary shaft; and an interlock link for linking an end portion of the drive link to an end portion of the follower link, wherein if an optical path reflected by the reflecting mirror is assumed to penetrate a predetermined point and a predetermined plane, the drive link is approximately vertical to the interlock link when the optical path intersects the plane approximately vertically.

Thus, when the drive link is rotated at a constant angular velocity, the follower link linked via the interlock link is also rotated. When the interlock link is approximately at a vertical position to the drive link, the interlock link has the maximum velocity of movement. In this state, the follower link also has a maximum angular velocity.

DESCRIPTION OF THE PREFERRED EMBODIMENTS

Figure 1:
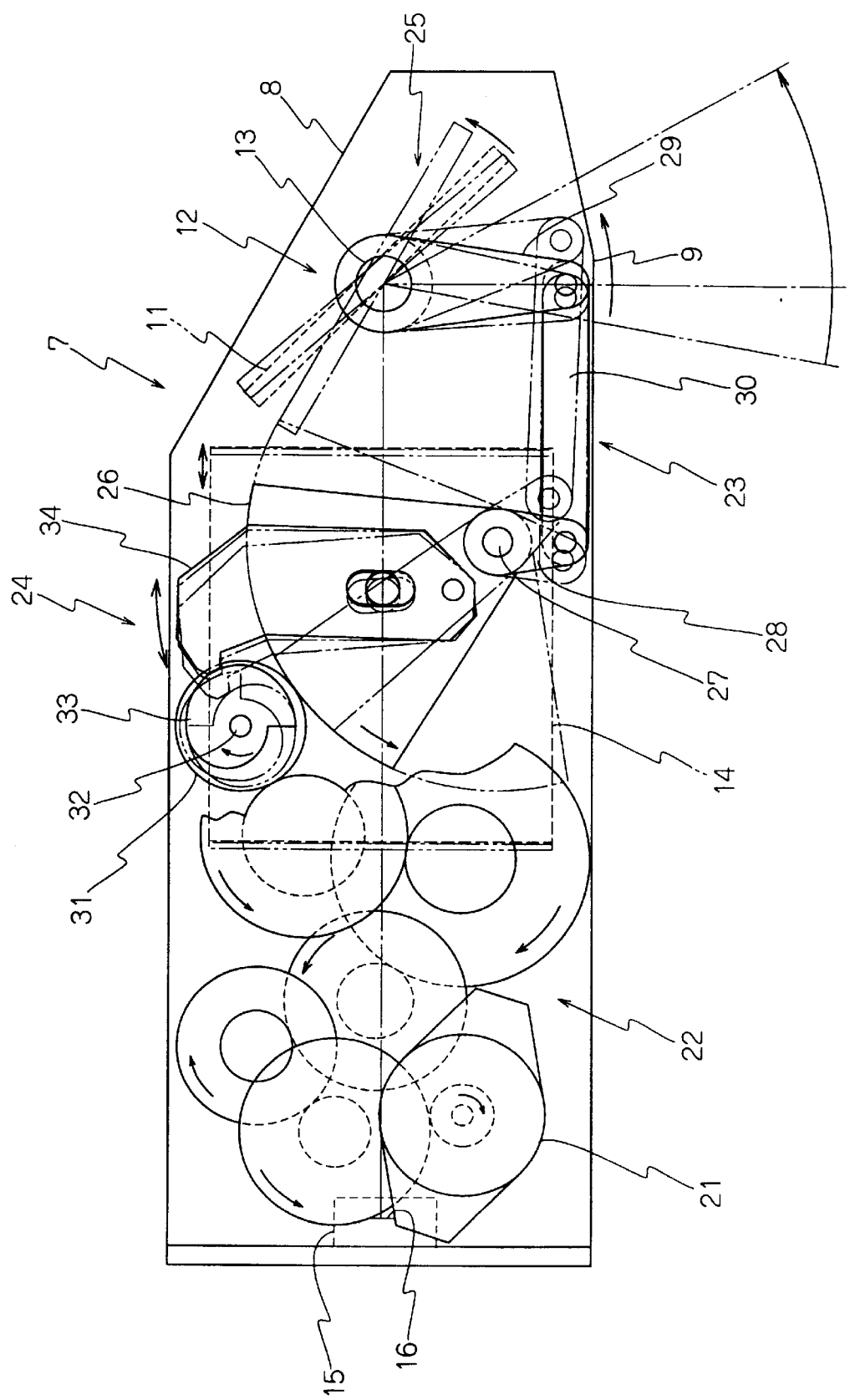
FIG. 1 is a cross sectional view showing an internal configuration of a scanner block of a stand scanner, i.e., an image scanning apparatus according to an embodiment of the present invention.
Figure 2:
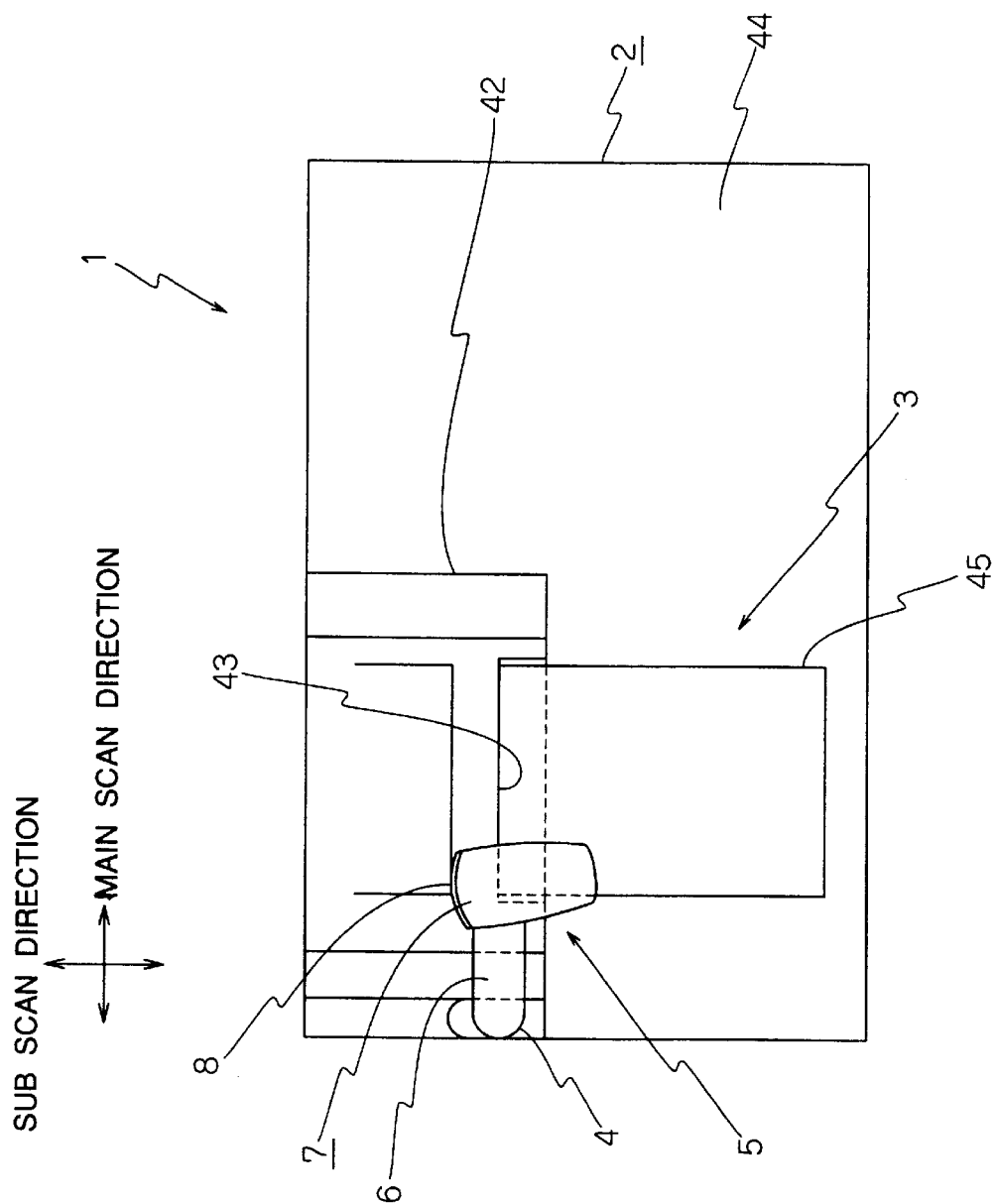
FIG. 2 is a plan view showing an external view of the entire stand scanner.
Figure 3:
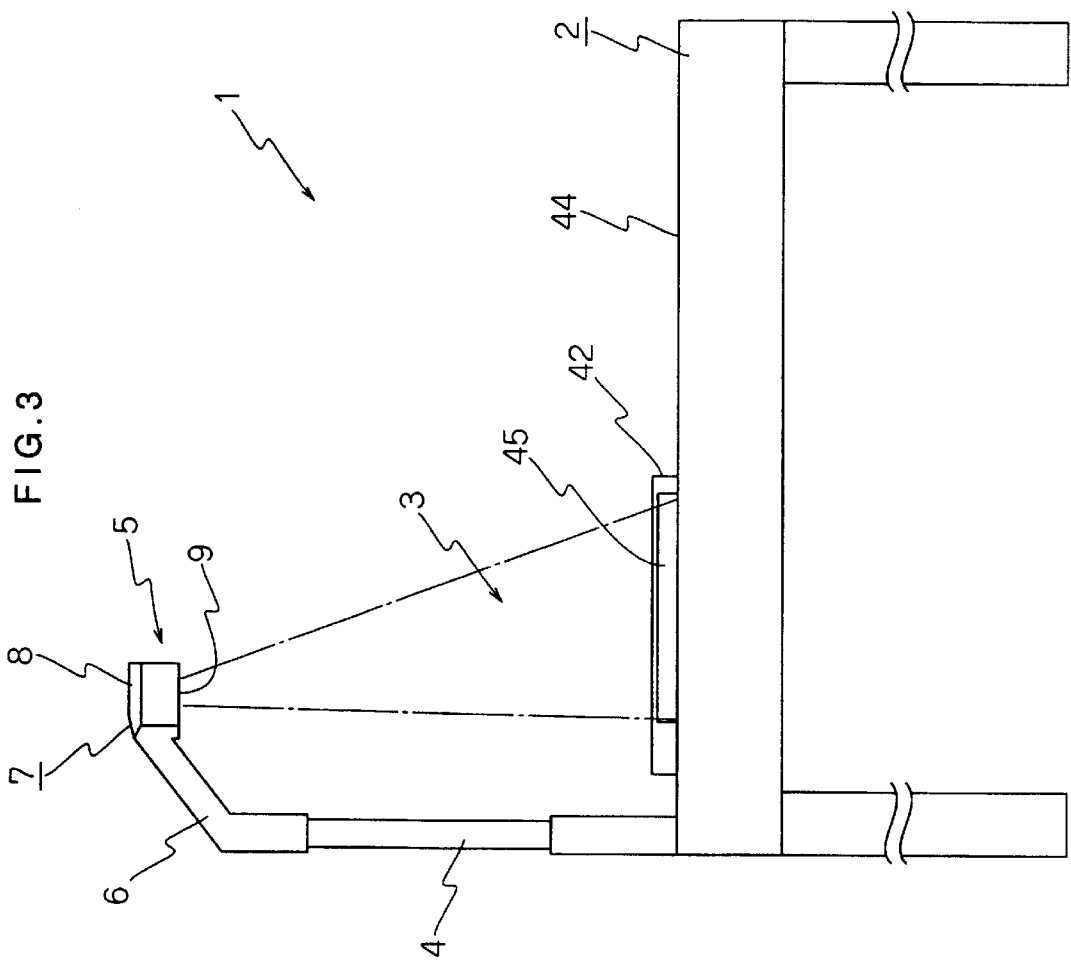
FIG. 3 is a front view showing the external view of the entire stand scanner.
Figure 4B:
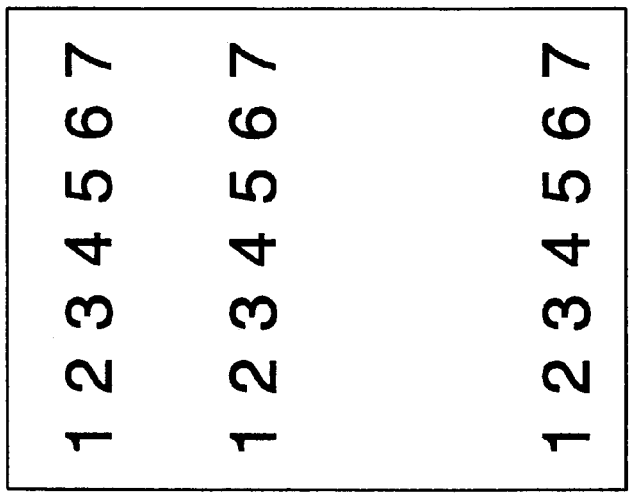
FIG. 4B schematically shows the image data after subjected to the pincushion correction.
Figure 4A:
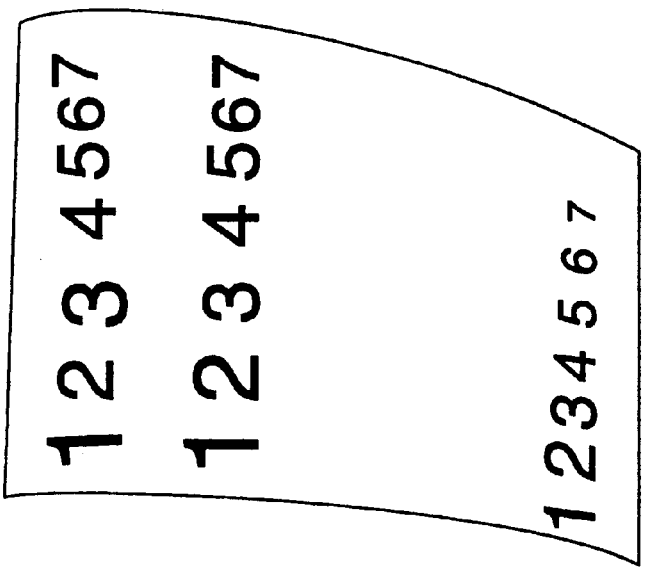
FIG. 4A schematically shows an image data immediately after a scanning prior to be subjected to a pincushion correction.
Figure 5:
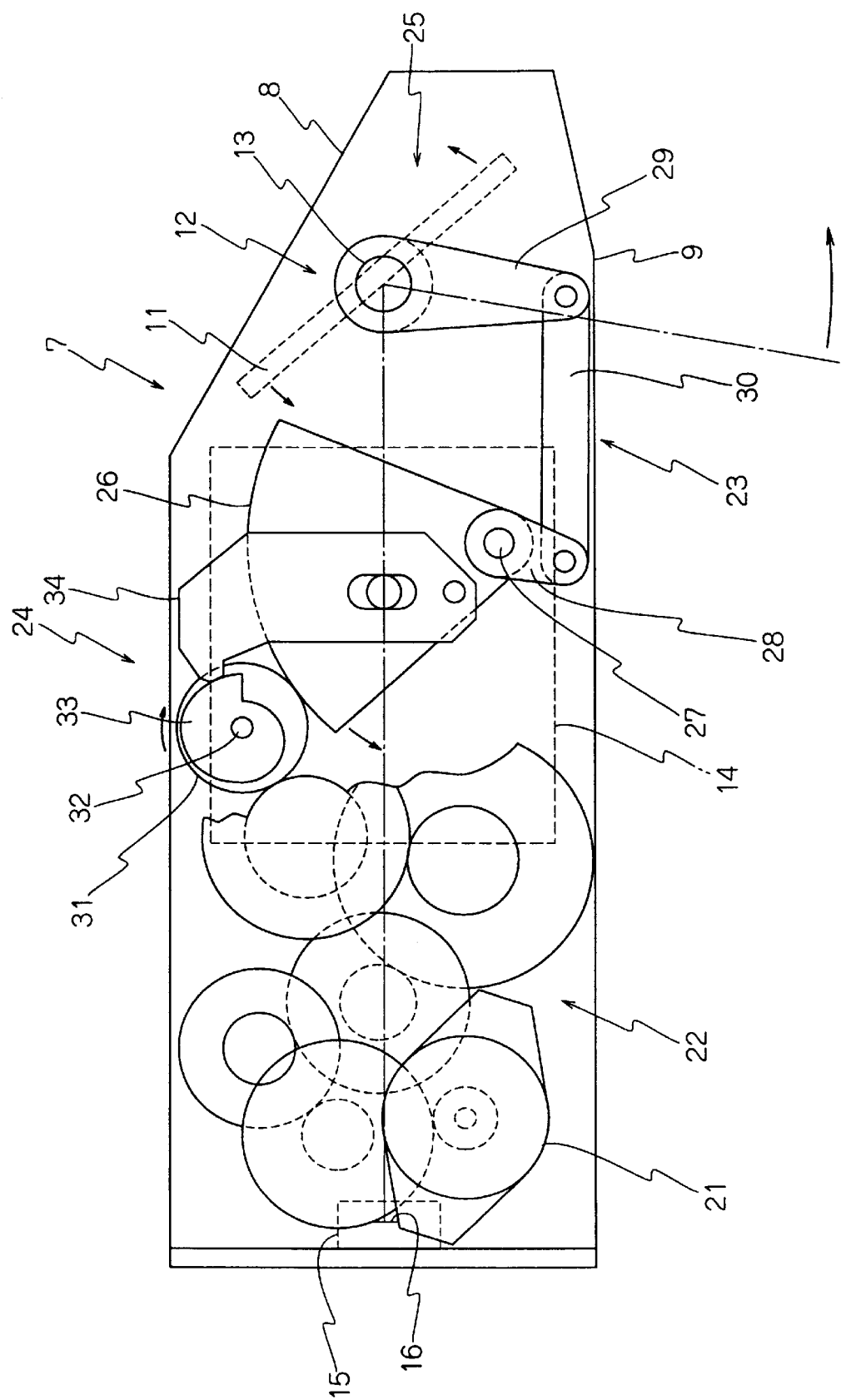
FIG. 5 is a cross sectional view showing an internal state of a scanner block in an initial stage of scanning.
Figure 6:
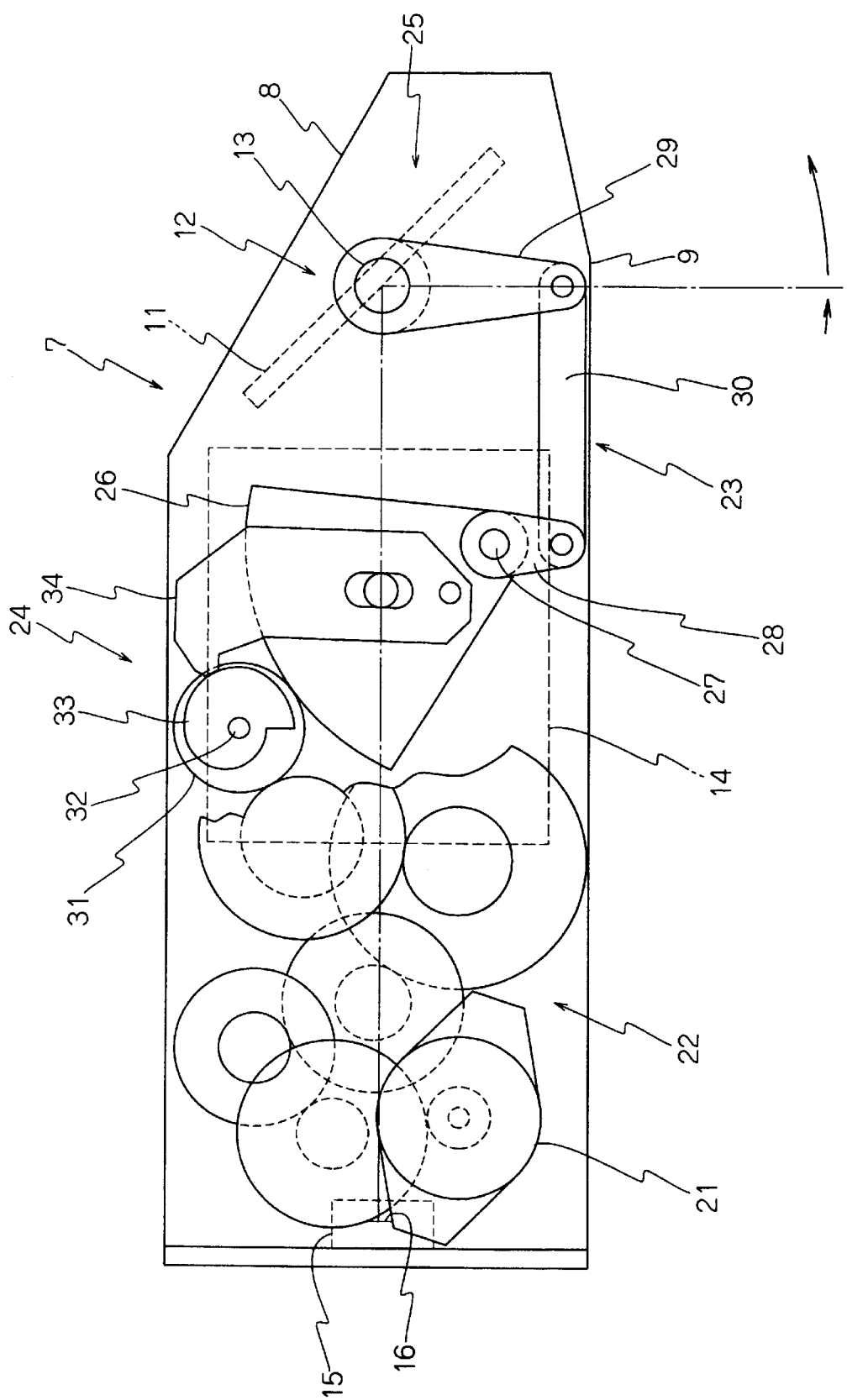
FIG. 6 is a cross sectional view showing an internal state of a scanner block in an intermediate stage of scanning.
Figure 7:
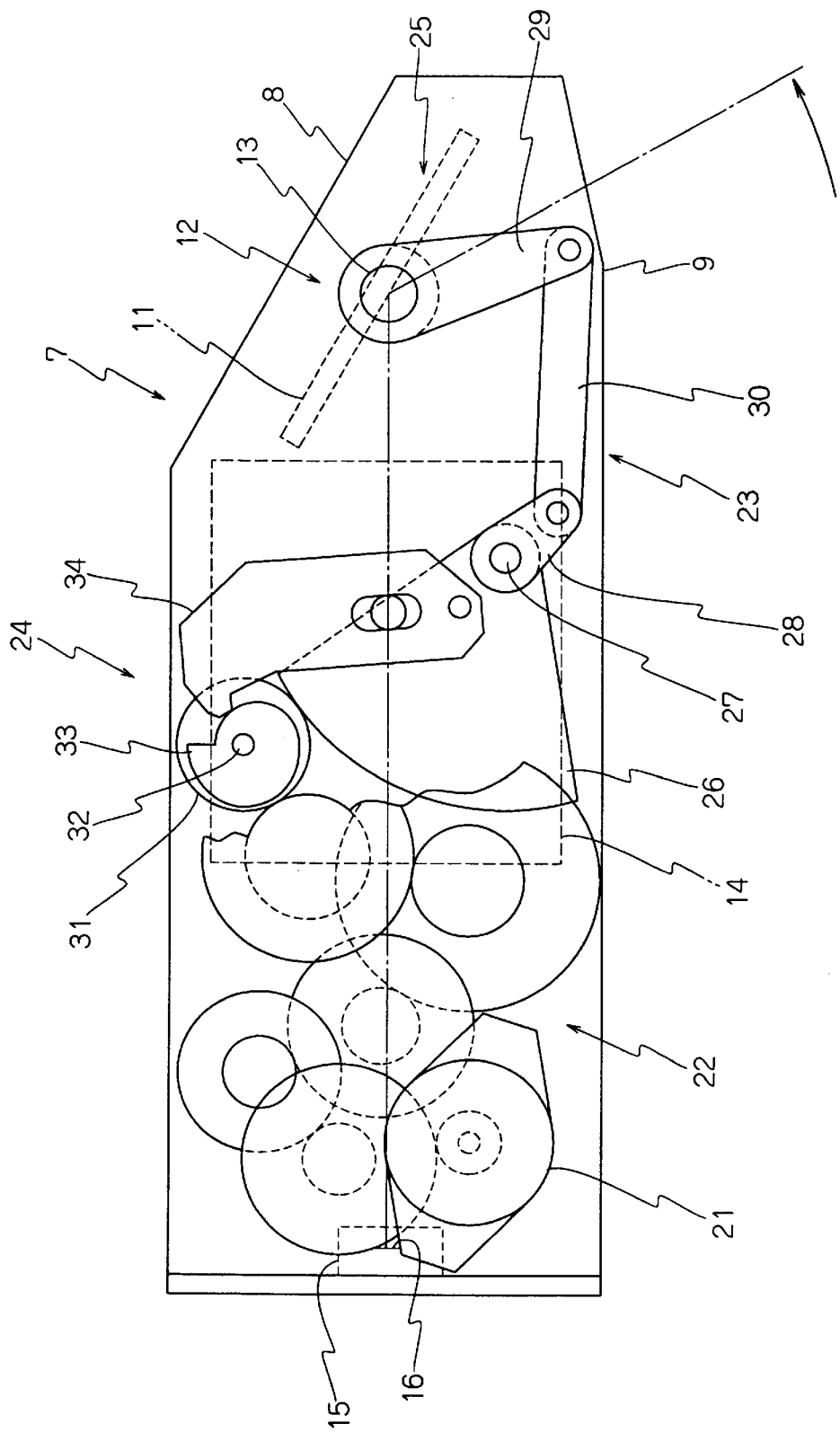
FIG. 7 is a cross sectional view showing an internal state of a scanner block in a final stage of scanning.

Description will now be directed to a stand scanner as an image scanning apparatus according to an embodiment of the present invention with reference to the attached drawings. It should be noted that FIG. 1 is a cross sectional view showing an internal configuration of a scanner head which is an essential portion of the stand scanner. FIG. 2 is a plan view and FIG. 3 is a front view showing an external view of the entire scanner. FIG. 4 schematically shows an image data scanned from an image to be scanned. FIG. 4A shows a state of the image data prior to a pincushion correction and FIG. 4B shows a state of the image data after the pincushion correction. FIGS. 5 to 7 shows a change of the internal state of the scanner head in a scanning procedure. FIG. 5 shows an initial stage, FIG. 6 shows an intermediate stage, and FIG. 7 shows a final stage of the scanning procedure.

The stand scanner 1 according to the present embodiment, as shown in FIG. 2 and FIG. 3, includes a manuscript table 2 on which a medium is to be placed. A manuscript area 3 is arranged in a left portion of this table. In FIG. 2, a manuscript placed has its leading edge at the top and trailing edge at the bottom. The main scan direction is from left to right and the sub scan direction is from top to bottom of the manuscript area, thus defining a continuous plane.

A scanner head 5 is mounted on a support arm 4 extending in a perpendicular direction from outside of the upper left of this manuscript area. As shown in FIG. 3, the scanner head 5 includes a box-shaped scanner block 7 and a support block 6 connected to the support arm 4. The scanner block 7 has a housing 8 in which a scan window 9 is formed corresponding to an upper left corner of the manuscript area in FIG. 2.

Referring to FIG. 1, the scanner block 7 of the scanner head 5 includes a reflecting mirror 11 provided above the scan window 9. This reflecting mirror is supported so that its reflection surface defines approximately 45 degrees to the horizontal direction of the scanner head 5 as well as to the vertical direction down to the manuscript area. Note that this reflecting mirror 11 is rotatably supported by a mirror support mechanism 12. This mirror support mechanism 12 has a rotary shaft 13 provided in parallel to the main scan direction, i.e., in the direction from left to right of the manuscript area.

A mono-focus lens 14 is adjacent to this reflecting mirror. The mono-focus lens 14 serves as an image formation optical system having an optical axis extending in a direction parallel to the sub scan direction. This mono-focus lens 14 is supported by a member support mechanism (not depicted) consisting of a guide rail and a mirror cylinder in such a manner that the mono-focus lens 14 can move in a direction parallel to the sub scan direction.

The scanner block 7 also includes an image sensor 15 arranged at the depth of the scanner block. The image sensor 15 includes a number of photo elements 16 consisting of charge coupled devices (CCD) or the like which are arranged in one-dimensional structure corresponding to the main scan direction.

In the stand scanner 1 according to the present embodiment, a scan optical path is formed from the manuscript area 3 on the manuscript table 3 to the reflecting mirror 11 and from the reflecting mirror via the mono-focus lens 14 to the image sensor 15. The image sensor 15 is arranged at a position where an image is formed by the mono-focus lens 14 from the image scanned in the manuscript area.

Moreover, in the stand scanner 1 according to the present embodiment, the scanner block 7 of the scanner head 5 includes a built-in stepping motor 21 as a drive source of a constant angular velocity. This stepping motor 21 is linked via a gear set to a link mechanism 23 and to a cam mechanism 24.

The link mechanism 23 is linked to the rotatable reflecting mirror 11. Thus, the gear set 22 and the link mechanism 23 constitute a mirror drive mechanism 25 for rotating the reflecting mirror 11. The cam mechanism is linked to the mono-focus lens 14 which can be displaced. The cam mechanism 24 and the link mechanism 23 are both linked to the gear set 22. Accordingly, the cam mechanism 24 serves as a displacement correction mechanism for displacing the mono-focus lens 14 in association with the rotation of the reflecting mirror 11.

More specifically, a final gear 26 in the gear set 22 has a sector shape and makes only a reciprocal movement with a predetermined angle. This final gear 26 has a rotary shaft 27 which is linked to the link mechanism 23, constituting a four-node linkage.

That is, the rotary shaft 27 of the final gear 26 of the gear set 22 is linked directly to a drive link 28 which is comparatively short, whereas the mirror support mechanism 12 has a rotary shaft 13 which is directly linked to a follower link 29 which is comparatively long.

The bottoms of these links 28 and 29 are connected via a interlock link 30. When the image sensor 15 scans a position in the manuscript area immediately below the reflecting mirror 11, the links 28 and 29 are positioned almost in a perpendicular direction. That is, this link mechanism 23 is constructed so that the links 28 and 29 are approximately vertical to the interlock link 30 when the optical path from the reflecting mirror 11 is approximately perpendicular to the surface of the manuscript area 3.

With the link mechanism 23 having the aforementioned configuration, the angular velocity of rotation of the reflecting mirror 11 is changed even if the angular velocity of the stepping motor 21 and that of the final gear 26 are constant. That is, in the stand scanner 1 of the present embodiment, as has been described above, the scan window 9 of the scanner head 5 is positioned directly above the upper left corner of the manuscript area 3. The link mechanism 23 is constructed so that when the scan position on the manuscript area 3 is immediately below the scan window 9, the reflecting mirror 11 has a highest angular velocity, and the angular velocity of the reflecting mirror 11 is decreased as the scan position on the manuscript area 3 moves apart from the position immediately below the scan window.

Moreover, a cam 33 of a modified configuration is linked directly to a rotary shaft 32 of an idler gear 31 which is the last but one in the gear set 22. This cam 33 is in abutment with a cam follower 34. The cam 33 has a spiral configuration having an outer circumferential surface which gradually departs from a cam center. The cam follower 34 is in abutment with this outer circumferential surface.

The cam follower 34 is formed in an longitudinal arm configuration extending approximately in a perpendicular direction. The cam follower 34 is supported at its bottom so that the cam follower 34 can make a reciprocal movement. The cam follower 34 is urged toward the cam 33 by an elastic mechanism such as a coil spring (not depicted). Thus, the cam follower 34 has a top end brought into abutment with the outer circumeferential surface of the cam 33 and a center portion linked to the mono-focus lens 14.

The high-speed cam mechanism 24 having the aforementioned configuration is constructed so as to bring the mono-focus lens 14 into a reciprocal movement at a non-constant velocity even if the stepping motor 21 and the idler gear 31 are rotated in a constant direction at a constant velocity with respect to an image scanning. That is, in the stand scanner 1 according to the present embodiment, as has been described above, the scan window 9 of the scanner head 5 is positioned above the upper left of the manuscript area 3. The cam mechanism 24 is constructed as follows. When the scan position to be scanned in the manuscript area 3 is immediately below the scan window 9, the distance between the mono-focus lens 14 and the image sensor 15 is shortest, and the distance becomes greater as the scan position moves apart from the upper left corner of manuscript area 3.

It should be noted that, as shown in FIG. 2, the stand scanner 1 according to the present embodiment includes a built-in impact printer 42. This impact printer 42 has at its end a position guide 43 which corresponds to the upper end of the manuscript area 3. Moreover, at the right of the impact printer 42 and the manuscript area 3, there is provided a working area 44 for handling manuscripts.

Moreover, in the stand scanner 1 according to the present invention, as has been described above, the scanner block 7 of the scanner head 5 includes various built-in optical parts and movable mechanisms which are controlled to be driven by a drive control circuit board (not depicted) contained in the support block 6 of the scanner head 5 together with an image processing circuit board (not depicted). Wiring of the built-in circuits in this support block 6 is contained in the support arm 4 and is connected to an interface (not depicted) arranged on or at a side of the manuscript table 2.

As has been described above, in the stand scanner 1 according to the present invention, the scanner block 7 of the scanner head 5 is positioned above the upper left corner of the manuscript area 3. Accordingly, as shown in FIG. 4A, an image data obtained from a scan is such that the lower end of the manuscript is displaced leftward. A control program and processing parameters for restoring this image data into a correct configuration as shown in FIG. 4B are contained, for example, in an image processing circuit built in the support block 6 of the scanner head 5.

The aforementioned image processing is often called as a pincushion. The scanner head scans a manuscript, i.e., an image data with a resolution higher than required at a final stage. A digital data of the main scan is subjected to a data processing using a conversion table corresponding to the sub scan position so that an image data deformed as shown in FIG. 4A is corrected into a normal rectangular configuration so as to obtain a uniformity in the entire length of the main scan line.

Furthermore, in the stand scanner 1 according to the present embodiment, as has been described above, the scanner head 5 is supported by the support arm 4 so as to be positioned above the upper left corner of the manuscript area 3. The support arm 4 is supported by an arm pivotal support mechanism (not depicted) built in the manuscript table, in such a manner that the support arm 4 can be rotated in a horizontal direction, and is fixedly held by an arm lock mechanism (not depicted) so that the scanner block 7 is positioned above the upper left corner of the manuscript area 3. When this arm lock mechanism is released, the support arm 4 can be rotated in the horizontal direction together so as to move the scanner head 5 from above the upper left corner of the manuscript area toward the back of the printer.

A user of this stand scanner 1, for example, can sit in front of the manuscript table 2 and read a manuscript 45 while it is scanned. The manuscript 45 need not be fed by a feed mechanism which may cause a jam.

The manuscript 45 placed in the manuscript area 3 is scanned by the scanner block 7 of the scanner head 5 supported by the support arm 4. Here, the main scan lines are scanned by the one-dimensional image sensor 15 fixed in the scanner block 7 while the scan position is moved in the sub scan direction by rotation of the reflecting mirror 11. Thus, the scanner block 7 need not move over the manuscript area.

As has been described above, the scanner block 7 in a fixed position moves the scan position in the sub scan direction through rotation of the reflecting mirror 11 and accordingly, the optical path length for the scan varies according to the rotation of the reflecting mirror 11. In the stand scanner 1 according to the present invention, the mono-focus lens 14 is interlocked with the rotation of the reflecting mirror 11 so as to be displaced in the optical axis direction, thus always enabling a preferable image formation on the image sensor 15.

More specifically, FIG. 5 shows an initial position of the reflecting mirror 11, where the reflecting mirror 1 is at a greatest angle to a horizontal plane and the scan optical path is slightly slanting from the perpendicular direction. In this state, the scanner block 7 scans the top of the manuscript.

Here, in the link mechanism 23, the lower ends of the links 28 and 29 are held at a back position. In the cam mechanism 24, the cam follower 34 is in abutment with the greatest diameter portion of the cam 33. Accordingly, the mono-focus lens 14 is slightly moved away from the image sensor 15. In this state, the image formation position of the manuscript area by the mono-focus lens 14 is matched with the light reception position of the image sensor 15, and an image scanned from the manuscript is preferably formed at the position of the image sensor 15.

The scan operation is started from the aforementioned initial state, and as shown in FIG. 6, the reflecting mirror 11 is rotated to decrease the angle to the horizontal plane and the optical path is positioned in a perpendicular direction. The reflecting mirror 11 is further rotated to decrease the angle to the horizontal plane and as shown in FIG. 7, and the optical path is positioned to be slanting to scan the bottom of the manuscript. Thus, the scan position on the manuscript 45 is moved from the top to the bottom.

Here, in the link mechanism 23, the lower ends of the links 28 and 29 are displaced in the sub scan direction as the cam 33 is rotated in the clockwise in the figure. The cam follower 34 is in abutment with a smaller diameter portion of the cam 33 and again brought into abutment with the greatest diameter portion of the cam 33. Accordingly, the mono-focus lens 14 approaches the image sensor 15 and then retrieves.

As has been described above, in the stand scanner 1 according to the present embodiment, while scanning the manuscript 45 from its top to the bottom, the optical path length is firstly reduced slightly and then increased. Thus, an image scanned is always formed preferably at the position of image sensor 15. That is, the scanner block 7 fixedly supported can preferably scan the entire manuscript placed in the manuscript area.

Moreover, in the stand scanner according to the present embodiment, the angular velocity of the rotation of the reflecting mirror 11 is firstly increased and then decreased so that the linear velocity of the sub scan on the manuscript is constant. Accordingly, if the image sensor 15 carries out a reading operation at a constant interval, it is possible to read main scan lines from the image on the manuscript 45 with a constant interval.

Furthermore, in the stand scanner 1 according to the present invention, as has been described above, the reflecting mirror is rotated with a velocity changing in a non-linear way and the mono-focus lens 14 is caused to make a reciprocal movement at a velocity changing in a non-linear way. These operations are realized by the link mechanism 23 and the cam mechanism 24 driven by the stepping motor 21 rotating at a constant velocity.

Consequently, operations the aforementioned reflecting mirror 11 and the mono-focus lens 14 need not be controlled with an electronic control. It is possible to accurately control the positions of the reflecting mirror 11 and the mono-focus lens 14 with a simple configuration. Moreover, the link mechanism 23 for rotating the reflecting mirror 11 and the cam mechanism 24 for moving the mono-focus lens 14 are mechanically interlocked and driven by a single stepping motor 21. This enables to reduce the number of parts required and reduce the total weight of the apparatus as well as enhance the production efficiency. Thus, the aforementioned configuration enables to appropriately interlock the operation of the reflecting mirror 11 with the operation of the mono-focus lens 14 which is different from the operation of the reflecting mirror 11.

The stand scanner 1 according to the present embodiment uses the mono-focus lens 14 as a single image formation optical system for image formation on the image sensor 15 from a scanned image from the manuscript area 3. That is, the optical system is also significantly simple. The focal point position is corrected only by displacement of a single optical part, i.e., the mono-focus lens 14. This simple configuration enables to reduce the load of the stepping motor 21.

It should be noted that in the stand scanner 1 according to the present invention, as has been described above, the impact printer 42 is arranged behind the manuscript area 3 and the working area 44 is provided at the right. This assures a preferable workability for a user. Moreover, a position guide 43 is provided at the front end of the impact printer 42 and enables to set a manuscript 45 accurately in the manuscript area 3.

Furthermore, in the stand scanner 1 according to the present embodiment, the scanner head 5 for scanning the manuscript 45 in the manuscript area 3 is positioned not above the center of the manuscript area 3 but in the upper left corner of the manuscript area 3. This assures a preferable workability when replacing the manuscript 45 manually.

Moreover, the support arm 4 on which the scanner head 5 is supported can be rotated. If necessary, the arm lock mechanism can be released to rotate the support arm 4 so that the scanner head 5 is positioned out of the manuscript area 3. Thus, when no manuscript is to be scanned, the manuscript area 3 can be used as a work area continuous to the work area 44. This also improves the workability.

Moreover, because the scanner head 5 is arranged above a position displaced from the center of the manuscript area 3, as shown in FIG. 4, the image data is deformed when scanned, but the image data is subjected to the pincushion correction in the image processing circuit. Thus, it is possible to externally output the image data in a normal state.

Furthermore, in the stand scanner 1 according to the present embodiment, the scanner block 7 is connected via the support block 6 to the support arm 4. This support block 6 used to appropriately position the scanner block 7 also contains various circuits. Thus, the internal space of the support block 6 is effectively utilized, reducing the entire space required.

It should be noted that the present invention is not to be limited to the aforementioned embodiment but can be modified in various ways within the scope of the invention. For example, in the aforementioned embodiment, the scanner head 5 is arranged above the manuscript table 2 so that the image on the surface of the manuscript can be observed by a user while it is scanned.

However, it is also possible to reverse the internal configuration of the aforementioned scanner head 5 and arrange the scanner head 5 below a contact glass, thus constituting a flat-bed type image scanner (not depicted). In this case, the configuration below the contact glass can be reduced because there is no need of moving the image sensor 15 and a pair of scan mirrors.

Moreover, in the aforementioned embodiment, the mono-focus lens 14 is moved to correct the focal point position corresponding to the sub scan position on the manuscript 45. Alternatively, it is also possible to displace the image sensor 15 without displacing the mono-focus lens 14, or to displace both of the mono-focus lens 14 and the image sensor 15. However, it is not advantageous to displace the image sensor 15 connected to various wires, and it is preferable to displace the mono-focus lens 14 as has been described above.

Furthermore, in the aforementioned embodiment, the image formation optical system includes only one mono-focus lens 14, simplifying the configuration. Alternatively, it is also possible to constitute this image formation optical system with a plurality of lenses. However, it is preferable that the image formation optical system include only one mono-focus lens 14 for this requires displacement only one part.

Moreover, in the aforementioned embodiment, the mirror 11 is rotated by the link mechanism 23 at a velocity varying in a non-linear way, whereas the mono-focus lens 14 is displaced by the cam mechanism 24 at a velocity changing in a non-linear way. Alternatively, it is also possible to rotate the reflecting mirror 11 with a cam mechanism and to displace the mono-focus lens 14 with a link mechanism.

Moreover, in the aforementioned embodiment, the image sensor 15 has photo elements 16 arranged in one array in the main scan direction. Alternatively, it is also possible to arrange the photo elements in a plurality of arrays for simultaneously scanning a plurality of main scan lines, or to arrange the photo elements 16 in a checker arrangement so as to increase the resolution by way of time division scan.

Furthermore, in the aforementioned embodiment, the scanner head is positioned above the upper left corner of the manuscript area 3, so as to enhance the workability while the image data is subjected to the pincushion correction. Alternatively, it is also possible to arrange the scanner head 5 above a desired position on the manuscript area 3.

For example, if the scanner head 5 is arranged above the upper center of the manuscript area 3, the image data is symmetric between right and left, simplifying the correction procedure. If the scanner head 5 is arranged above the center of the manuscript area 3, the image data is symmetric not only between right and left but also between the top and bottom, further simplifying the correction procedure.

In case the scanner head 5 is arranged above the center of the manuscript area, the image data is symmetric between right and left and between the top and bottom, but from the workability viewpoint such as replacement of the manuscript, it is preferable that the scanner head 5 be arranged above the upper left corner of the manuscript area 3.

Moreover, in the aforementioned embodiment, the stepping motor 21 rotating at a constant velocity is connected via the gear set 33 to the link mechanism 23 and the mirror drive mechanism 25 so as to rotate the reflecting mirror 11 at an angular speed changing in a non-linear ways so that the manuscript area 3 is scanned by the image sensor 15 in the sub scan direction at a constant velocity.

The aforementioned mirror drive mechanism 25 can also be used for scanning a reflected light of a laser beam emitted from a laser source, so as to realize a laser printer (not depicted) for writing the main scan line on the surface of the photo sensitive body at a constant linear velocity without using a fθ lens, an image projection apparatus (not depicted) for displaying the main scan lines on a wall surface at a constant velocity.

The present invention having the aforementioned configuration have effects as follows.

The image scanning method according to an embodiment of the present invention comprises steps of: reflecting with a reflecting mirror an image light generated from an image of a medium arranged in a plane continuous in a main scan direction and in a sub scan direction, into a predetermined direction vertically intersecting the main scan direction; introducing the reflected image light to an image formation optical system so as to obtain an image formation at position of an image sensor consisting of a number of photo elements arranged in a direction parallel to the main scan direction; and rotating with a drive force of a drive source the reflecting mirror pivotally supported by a rotary shaft parallel to the main scan direction so that a scan position of the image sensor on the medium is moved in the sub scan direction; wherein the drive source provides rotation of a constant angular velocity which is converted by a four-node link mechanism into the rotation of the reflecting mirror having an angular velocity changed in a non-linear way, so that the scan position on the scan medium by the image sensor is moved in the sub scan direction at a constant linear velocity.

Consequently, it is possible to shift the scan position of the image sensor on the scan medium in the sub scan direction at a constant linear velocity, enabling to preferably scan an image on the scan medium with a simple configuration.

The image scanning apparatus according to an embodiment of the present invention comprises: medium placing means for placing a scan medium having on its surface an image to be scanned, on a flat plane continuous in a main scan direction and in a sub scan direction; a reflecting mirror for reflecting an image light generated from the image of the medium arranged by the medium setting means, into a predetermined direction vertically intersecting the main scan direction; an image formation optical system for image formation at a predetermined position from the reflected image light; an image sensor provided at the image formation position of this image formation optical system and consisting of a number of photo elements arranged in a direction parallel to the main scan direction; a drive source for generating a predetermined drive force; a mirror support mechanism having a rotary shaft for supporting the reflecting mirror so as to be rotatable in a direction parallel to the main scan direction; and a mirror drive mechanism linked to the drive source for rotating the reflecting mirror at an angular velocity changing in a non-linear way so that a scan position of the image sensor on the medium is moved in the sub scan direction at a constant linear velocity.

Consequently, it is possible to shift the scan position of the image sensor on the scan medium in the sub scan direction at a constant linear velocity, enabling to preferably scan an image on the scan medium with a simple configuration.

According to another aspect of the invention, the image scanning apparatus is further characterized in that the mirror drive mechanism comprises a four-node link mechanism.

The four-node link mechanism enables to easily convert the rotation of the drive source having a constant angular velocity into the rotation of the reflecting mirror having an angular velocity changing in a non-linear way.

According to another aspect of the invention, the image scanning apparatus is further characterized in that the link mechanism has: a drive link of a small crank shape linked to the drive source; a follower link of a long crank shape linked to the reflecting mirror; and an interlock link for linking between an end portion of the drive link and an end portion of the follower link, wherein the drive link is approximately at a right angle to the interlock link when an optical path of an image light coming into the reflecting mirror intersects the scan image approximately at a right angle.

Thus, with a simple configuration, it is possible to obtain a constant linear velocity of the scan position on the scan medium.

The mirror drive method according to the present invention drives a rotatable reflecting mirror for reflecting an optical path penetrating a predetermined point and a predetermined plane in such a manner that an intersecting point of the optical path and the plane is shifted in a linear way, wherein a rotation of a constant angular velocity is converted into a rotation of an angular velocity changing in a non-linear way, so that the intersecting point is shifted at a constant linear velocity.

Thus, with a simple configuration, it is possible to shift the intersecting point of the optical path with the plane at a constant linear velocity.

The mirror drive mechanism according to the presnet invention comprises: a drive link of a short crank shape which is driven to rotate at a constant angular velocity; a follower link of a long crank shape which is linked to a reflecting mirror supported on a rotary shaft; and an interlock link for linking an end portion of the drive link to an end portion of the follower link, wherein if an optical path reflected by the reflecting mirror is assumed to penetrate a predetermined point and a predetermined plane, the drive link is approximately vertical to the interlock link when the optical path intersects the plane approximately vertically.

Thus, with a simple configuration, it is possible to shift the intersecting point of the optical path with the plane at a constant linear velocity.

The invention may be embodied in other specific forms without departing from the spirit or essential characteristic thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of japanese patent application no. 09-253348 (filed on Sep. 18$^{th}$, 1997) including specification, claims, drawings and summary are incorporated herein by reference in its entirety.

What is claimed is:

1. An image scanning method comprising steps of: reflecting with a reflecting mirror an image light generated from an image of a medium arranged in a plane continuous in a main scan direction and in a sub scan direction, into a predetermined direction vertically intersecting said main scan direction; introducing said reflected image light to an image formation optical system so as to obtain an image formation at position of an image sensor that includes a number of photo elements arranged in a direction parallel to said main scan direction; and rotating with a drive force of a drive source said reflecting mirror pivotally supported by a rotary shaft parallel to said main scan direction so that a scan position of said image sensor on said medium is moved in said sub scan direction, wherein said drive source provides rotation of a constant angular velocity which is converted by a four-node link mechanism into said rotation of said reflecting mirror having an angular velocity changed in a non-linear way, so that said scan position on said scan medium by said image sensor is moved in said sub scan direction at a constant linear velocity.

2. An image scanning apparatus comprising: medium placing means for placing a scan medium having on its surface an image to be scanned, on a flat plane continuous in a main scan direction and in a sub scan direction;

a reflecting mirror for reflecting an image light generated from said image of said medium arranged by said medium setting means, into a predetermined direction vertically intersecting said main scan direction;

an image formation optical system for image formation at a predetermined position from said reflected image light;

an image sensor provided at said image formation position of this image formation optical system and that includes a number of photo elements arranged in a direction parallel to said main scan direction;

a drive source for generating a predetermined drive force;

a mirror support mechanism having a rotary shaft for supporting said reflecting mirror so as to be rotatable in a direction parallel to said main scan direction; and a mirror drive mechanism linked to said drive source for rotating said reflecting mirror at an angular velocity changing in a non-linear way so that a scan position of said image sensor on said medium is moved in said sub scan direction at a constant linear velocity.

3. An image scanning apparatus as claimed in claim 2, wherein said mirror drive mechanism comprises a four-node link mechanism.

4. An image scanning apparatus as claimed in claim 3, wherein said link mechanism has: a drive link of a small crank shape linked to said drive source; a follower link of a long crank shape linked to said reflecting mirror; and an interlock link for linking between an end portion of said drive link and an end portion of said follower link, wherein said drive link is approximately at a right angle to said interlock link when an optical path of an image light coming into said reflecting mirror intersects said scan image approximately at a right angle.

5. A mirror drive method for moving a rotatable reflecting mirror for reflecting an optical path penetrating a predetermined point and a predetermined plane in such a manner that an intersecting point of said optical path and said plane is shifted in a linear way, wherein a rotation of a constant angular velocity is converted into a rotation of an angular velocity changing in a non-linear way, so that said intersecting point is shifted at a constant linear velocity.

6. A mirror drive mechanism comprising: a drive link of a short crank shape which is driven to rotate at a constant angular velocity; a follower link of a long crank shape which is linked to a reflecting mirror supported on a rotary shaft; and an interlock link for linking an end portion of said drive link to an end portion of said follower link, wherein if an optical path reflected by said reflecting mirror is assumed to penetrate a predetermined point and a predetermined plane, said drive link is approximately vertical to said interlock link when said optical path intersects said plane approximately vertically.

* * * * *